No. 612,165. Patented Oct. 11, 1898.
S. N. JUDD.
CUT-OFF FOR CISTERNS.
(Application filed Jan. 27, 1898.)
(No Model.)
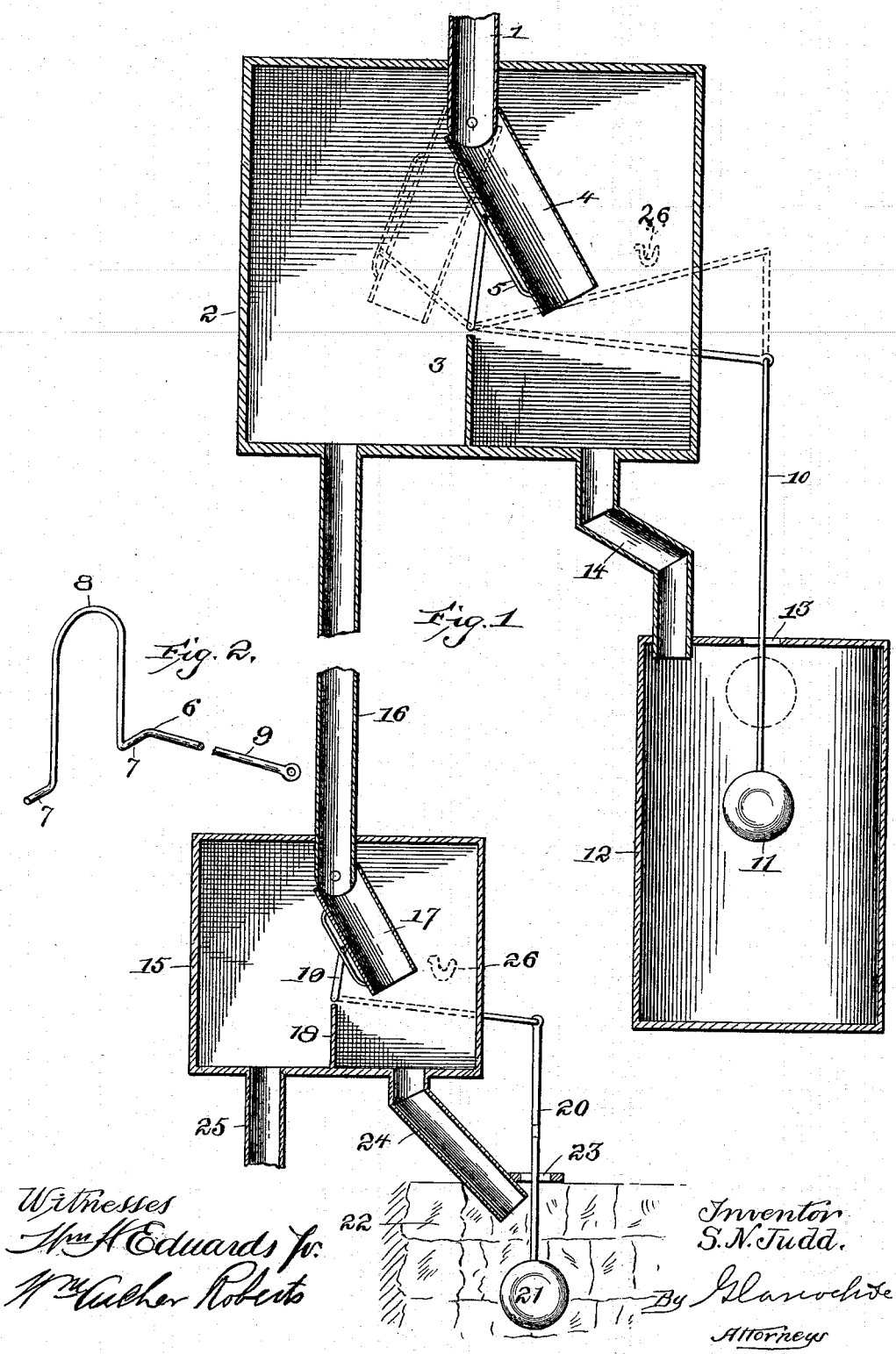
Witnesses
Wm H Edwards Jr
Wm Luther Roberts
Inventor
S. N. Judd.
By Glanochde
Attorneys

UNITED STATES PATENT OFFICE.

SAMUEL N. JUDD, OF LURAY, VIRGINIA.

CUT-OFF FOR CISTERNS.

SPECIFICATION forming part of Letters Patent No. 612,165, dated October 11, 1898.

Application filed January 27, 1898. Serial No. 668,115. (No model.)

*To all whom it may concern:*

Be it known that I, SAMUEL N. JUDD, a citizen of the United States, residing at Luray, in the county of Page and State of Virginia, have invented certain new and useful Improvements in Cut-Offs for Cisterns; and I do hereby declare the following to be a full, clear, and exact description of the invention, such as will enable others skilled in the art to which it appertains to make and use the same.

My invention has relation to automatic cut-offs adapted to be interposed between the gutter-pipe and a cistern and adapted to connect the gutter-pipe with the cistern.

The object of the invention is to provide a device, said device adapted to lead the water from the gutter-pipe to the cistern, the device being constructed, however, so that the first water from the roof—that is, the water that contains the filth, &c., upon the roof—is conveyed into a tank, the filth being carried into said tank. When the roof is thoroughly flushed and the tank is filled, an automatic cut-off is provided whereby the pure water is then thrown into the said tank.

The further object of the invention is to provide a device whereby when the cistern is filled with water the said device acts automatically in cutting off the water from the cistern and throws it into a waste-pipe.

The further object of the invention is to provide a device of the nature as above stated, said device being absolutely automatic in its operation and simple in construction.

In the accompanying drawings, Figure 1 is a transverse sectional view of the entire device, and Fig. 2 is a perspective view of a peculiar-shaped lever employed to throw the cut-off.

The lower end of the gutter-pipe 1 extends through the top of the chamber 2, said chamber having on its bottom a partition 3, extending transversely across the cut-off spout 4, and is pivoted by any suitable means at its upper end to the lower end of the gutter-spout 1. The said cut-off spout 4 is provided on one side with a rod 5, the said rod 5 being secured at its ends to the said cut-off spout 4, the intermediate portion of the said rod being away from the side of the cut-off spout 4 and leaving an intervening space. The horizontal portions 7 7 of the lever 6 are fulcrumed in the sides of the chamber 2, the bowed section 8 of the said lever connecting the horizontal sections 7 7, said bowed section passing between the rod 5 and the cut-off spout 4, as shown in detail in Fig. 1. The extreme end 9 of the said lever is pivotally connected to the upper end of the rod 10. To the lower end of said rod 10 a suitable ball or other float 11 is attached. A tank 12 incases the said ball 11. The rod 10 passes through an elongated opening 13 in the top of the said tank or a cross-strip located at the top of the tank, said opening 13 forming a guide for the rod 10, the elongation of the opening compensating for the arc described by the end 9 with the lever 6, and thus permitting the float 11 to rise and fall without binding and at the same time guiding the rod 10. The pipe 14 connects the tank 12 with the bottom of the chamber 2, the said pipe 14 entering the said chamber on one side of the partition 3. A second chamber 15 is provided, and the pipe 16 connects the bottom of the chamber 2 on the opposite side of the partition 3 with the chamber 15. To the lower end of the chamber 16 the cut-off spout 17 is pivotally attached, the said spout being similar in its construction and similar in its mounting to that of spout 4 in the chamber 2. The chamber 15 is also provided in its bottom with a transverse partition 18, and a lever 19, similar to lever 6, is located in the secondary chamber 15. The said lever 19 is connected to the cut-off spout 17 in the same manner as that shown and described for the lever 6. The outer end of the lever 19 is pivotally connected to a perpendicular rod 20, and to the lower end of the said rod 20 is fixed a ball or other float 21, the said float 21 being located in the cistern 22. A guide 23 is provided, said guide permitting the rod 20 to pass perpendicularly therethrough without binding in a manner similar to the guide for the rod 10. The pipe 24 connects the bottom of the secondary chamber 15 on one side of the partition 18 with the cistern 22, and on the opposite side of the partition 18 a waste-pipe 25 is connected with the bottom of the secondary chamber 15.

The operation of the device is as follows: Its normal position is that as shown in heavy lines in Fig. 1. When the rain begins to fall, the first water coming down the gutter-pipe 1 (the said water containing the filth and debris from the roof) is conveyed through the cut-off spout 4 into the right-hand portion of the chamber 1. This water containing the filth passes down through the pipe 14 into the tank 12. When the roof is thoroughly washed and when the water in the tank 12 assumes the proper level, the float 11 rises and assumes the position as shown in the dotted lines in Fig. 1. The rod 10 is moved up and the outer end of the lever 6 is elevated, the said lever 6 turning on its fulcrum-points 7 7 and causing the bowed section 8 to extend over into the left-hand portion of the tank 1, the said section 8 being bowed by means of the rod 5 to the cut-off spout 4. The said cut-off spout 4 is swung over and the cut-off assumes the position as shown in the dotted lines in Fig. 1. Thus the pure water as it now comes from the gutter-pipe is deposited in the lower left-hand portion of the chamber 2, and this water passes through the pipe 16 and cut-off 17 into the lower right-hand portion of the secondary chamber 15. The water then passes through the pipe 24 into the cistern 22. When the cistern 22 is about to be filled, the water coming in contact with the float 21 causes the said float to rise, and the outer end of the lever 19 is forced up and the lower end of the cut-off spout 17 is swung over into the left-hand portion of the chamber 15, and thus the surplus water is caused to pass into the waste-pipe 25, from whence it is led to any desired place. In view of the fact that the upper end of the bowed section 8 is linked through the rod 5 the levers 6 and 19 are permitted to act in conjunction with the cut-offs 4 and 17 without any binding or friction, and when the said cut-offs are in their left-hand positions they are nested in the bow of the section 8, as illustrated in the dotted lines in Fig. 1.

Should it be desirable at any time to throw all of the water from the roof directly into the cistern without letting any of the water enter the tank 12, the outer end 9 of the lever 6 is elevated and lodged upon the hook 26. Thus the cut-off spout 4 is thrown in its left-hand position and all of the water will pass into the cistern 22. A hook similar to 26 may be provided on the secondary chamber 15 should it be desired to throw all of the water into the waste-pipe 25.

Having described my invention, what I claim as new, and desire to secure by Letters Patent, is—

1. A device such as described, consisting of a chamber, a cut-off located in said chamber, a tank connected with one side of said chamber, a suitable means located in said tank for operating the cut-off, a secondary chamber connected with the opposite side of the first said chamber, a cut-off located in the secondary chamber, one side of the secondary chamber being connected with the cistern, a suitable means located in the cistern for operating the cut-off in the secondary chamber, a waste-outlet located in the opposite side of the secondary chamber.

2. In a device such as described, a chamber receiving the lower end of the water-pipe, a cut-off pivotally mounted below the lower end of said water-pipe, a rod fixed at its ends to said cut-off, but leaving an intervening space between the rod and the side of the cut-off, a lever fulcrumed in the chamber, said lever having a bowed section passing through the space between the rod and the cut-off, a float connected to the end of said lever and adapted to operate the cut-off.

3. In a device such as described, a chamber having a water-pipe entering therein, a cut-off pivotally mounted below the lower end of said water-pipe, a rod attached at its ends to said cut-off and having a space between the said rod and the cut-off, a lever suitably fulcrumed in the chamber, said lever having a bowed section, said bowed section passing through the space between the rod and the said cut-off, a perpendicular rod pivoted to the outer end of said lever, a float fixed to the lower end of said perpendicular rod, a receptacle containing said float and a water connection between the chamber and the receptacle containing the float.

4. In a device such as described, a chamber having a water-pipe entering therein, a cut-off spout pivoted to the lower end of said water-pipe, a rod fixed at its ends to the said cut-off spout and having a space between the rod and the said cut-off spout, a lever having a bowed section said lever being fulcrumed in perpendicular alinement with the pivotal point of the cut-off spout, the bowed section of the lever passing through the space between the rod and the said cut-off spout and a suitable means for operating the lever.

5. In a device such as described, a chamber having a water-pipe entering therein, a cut-off suitably pivoted within said chamber, a lever fulcrumed in the chamber and connected to the cut-off and adapted to operate the same, one end of the said lever extending through the side of the chamber, a suitable means for normally operating said lever, a hook located on the outer side of the chamber and adapted to retain the end of said lever in an elevated position.

In testimony whereof I affix my signature in presence of two witnesses.

SAMUEL N. JUDD.

Witnesses:
A. E. GLASCOCK,
BERTHA L. DANA.